(12) United States Patent  (10) Patent No.: US 7,142,817 B2
Hankui  (45) Date of Patent: Nov. 28, 2006

(54) PORTABLE TELEPHONE

(75) Inventor: Eiji Hankui, Minato-ku (JP)

(73) Assignee: NEC Corporation, Tokyo (JP)

( * ) Notice: Subject to any disclaimer, the term of this patent is extended or adjusted under 35 U.S.C. 154(b) by 565 days.

(21) Appl. No.: 10/416,301

(22) PCT Filed: Feb. 1, 2002

(86) PCT No.: PCT/JP02/00855

§ 371 (c)(1),
(2), (4) Date: May 9, 2003

(87) PCT Pub. No.: WO02/063788

PCT Pub. Date: Aug. 15, 2002

(65) Prior Publication Data

US 2004/0023701 A1  Feb. 5, 2004

(30) Foreign Application Priority Data

Feb. 6, 2001 (JP) ............................. 2001-029130

(51) Int. Cl.
*H04M 1/00* (2006.01)
(52) U.S. Cl. ............... 455/50.1; 455/575.1; 455/575.2; 455/90.2; 361/704
(58) Field of Classification Search ............. 455/550.1, 455/575.1, 575.2, 575.5, 90.2, 90.3; 361/704, 361/705
See application file for complete search history.

(56) References Cited

U.S. PATENT DOCUMENTS

| | | |
|---|---|---|
| 5,493,704 A | 2/1996 | Grangeat et al. |
| 5,539,148 A | 7/1996 | Konishi et al. |
| 5,973,923 A * | 10/1999 | Jitaru ........................ 361/704 |
| 6,049,147 A * | 4/2000 | Sanada et al. ................ 310/42 |
| 6,097,339 A | 8/2000 | Filipovic et al. |

FOREIGN PATENT DOCUMENTS

| | | |
|---|---|---|
| DE | 41 04 038 A | 8/1991 |
| EP | 1 162 753 A2 | 12/2001 |
| GB | 2 351 848 A | 1/2001 |
| JP | H04-207099 A | 7/1992 |
| JP | 10-65379 A | 3/1998 |
| JP | 11-31909 A | 2/1999 |
| JP | 2000-323921 A | 11/2000 |
| WO | WO 94/18817 A1 | 8/1994 |

* cited by examiner

*Primary Examiner*—Matthew Anderson
*Assistant Examiner*—Minh Dao
(74) *Attorney, Agent, or Firm*—Sughrue Mion, PLLC

(57) ABSTRACT

A low-profile cellular phone has improved radiation efficiency during a call for higher communication quality, and is of a structure allowing the cellular phone to be of a lower profile than heretofore with the magnetic plate and awkward structures such as its fixing jigs being not disposed in a gap within an outer case of the cellular phone.

A cellular phone includes at least an antenna for mainly sending and receiving radio waves for communication with a base-station, a printed-circuit board having a metal surface as a board ground layer for the antenna and electronic components mounted thereon, a feeder for supplying electric power to the antenna and the metal surface, a magnetic plate made of a magnetic material housed in an outer case for intensifying a radio wave in a free space during a talk, and an outer case housing therein the printed-circuit board, the feeder, and the magnetic plate. The cellular phone is arranged such that the printed-circuit board is of a multi-layered structure, and the magnetic plate is embedded partly or entirely between inner layers of the printed-circuit board spaced from the board ground layer and opposite to a side of the printed-circuit board spaced where the antenna is located.

11 Claims, 9 Drawing Sheets

(a)　　　　　　　　　(b)

(a)　　　　　　　　　(b)

(a)      (b)

(a)      (b)

PORTABLE TELEPHONE

TECHNICAL FIELD

The present invention relates to a portable radio communication device such as a cellular phone, and more particularly to a cellular phone which is of a low profile and is designed for high communication quality.

BACKGROUND ART

One typical conventional cellular phone will be described below with reference to FIGS. 1(a) through 1(c) of the accompanying drawings. FIG. 1(a) is a front elevational view of the cellular phone, FIG. 1(b) a cross-sectional view of the cellular phone with an antenna assembly extended, and FIG. 1(c) a cross-sectional view of the cellular phone with the antenna assembly retracted in a case.

As shown in FIGS. 1(a) through 1(c), the conventional cellular phone comprises antenna assembly 1 including whip antenna 1a and helical antenna 1b, feeder 2, printed-circuit board 3, ground layer 3a, outer case 4, through hole 7, liquid-crystal screen 8, and keypad 9. The printed-circuit board supports thereon circuits and related components for transmitting and processing signals and electric power. However, these circuits and related components are omitted from illustration in FIGS. 1(a) through 1(c).

The cellular phone is basically constructed of antenna assembly 1 for radiating radio waves for communication with a base station, feeder 2 for supplying electric power to the antenna for radiating radio waves therefrom, and printed-circuit board 3 supporting thereon circuits and other components for generating and transmitting electric power. Usually, printed-circuit board 3 comprises a multilayer board having an inner layer (conductive layer) which includes a metal surface operating as a circuit ground layer. The antenna has an end connected through the feeder and the through hole to the metal surface. Outer case 4 is usually made of a nonmetal material such as plastics or resin, and houses therein printed-circuit board 3 and feeder 2. Outer case 4 also supports thereon a display unit comprising liquid-crystal screen 8 and a control unit such as keypad 9. The display unit and the control unit are normally mounted on outer case 4 remotely from feeder 2.

When the cellular phone is used with the antenna assembly extended, the whip antenna is connected to the feeder. When the cellular phone is used with the antenna assembly retracted in the case, the helical antenna (not shown in detailed structure) mounted on the distal end of the whip antenna is connected to the feeder while remaining seated on an upper surface of the outer case. The whip antenna or the helical antenna operates as a transmission antenna dependent on whether the antenna assembly is extended or retracted. The feeder has an end connected to the metal surface as the board ground layer regardless of whether the antenna assembly is extended or retracted. Therefore, a current flows in reality to the metal surface, which operates as an auxiliary antenna. On the cellular phone, the antenna assembly and the metal surface (ground layer) operate as a radiation source for radiating radio waves.

When the user communicates with another party using the cellular phone (an event hereinafter referred to as "call"), the antenna gain and the radiation efficiency are lowered due to the effect of the human body of the user, resulting in a reduction in the communication quality.

A cellular phone according to the invention disclosed in Japanese laid-open patent publication No. 2000-323921 is shown in FIGS. 2(a) and 2(b) of the accompanying drawings. FIG. 2(a) is a cross-sectional view of the cellular phone with an antenna assembly extended, and FIG. 2(b) a cross-sectional view of the cellular phone with the antenna assembly retracted in the case. Reference characters shown in FIGS. 2(a) and 2(b) are identical to those shown in FIGS. 1(a) through 1(c). The cellular phone includes plate 5 made of a magnetic material (hereinafter referred to as "magnetic plate") inserted in the outer case of the conventional cellular phone. The magnetic plate reflects a radio wave radiated from the antenna into a space where no human body is positioned, with the result that the radio wave is intensified in the space during the call for improved radiation efficiency. The magnetic plate that is used should preferably be minimally capable of absorbing electric power by itself from the standpoint of improving radiation efficiency. It is preferable that the loss term of the complex permeability of the magnetic plate be minimum.

As shown in FIGS. 2(a) and 2(b), magnetic plate 5 which has heretofore been known is positioned on the keypad side in the vicinity of the antenna feeder, and placed in a gap between the printed-circuit board and the outer case.

The incorporation of the magnetic plate into actual cellular phones will be considered below. If a cellular phone has a relatively large thickness, then no particular problem arises in inserting the magnetic plate into the cellular phone as a sufficient gap is provided in the cellular phone.

However, such a gap in a low-profile cellular phone is often filled up with circuit components and display components such as a liquid-crystal panel. For placing the magnetic plate in the low-profile cellular phone, awkward structures (not shown) such as attachments and mechanisms for fixing the magnetic plate in position need to be provided in the gap. For fixing the magnetic plate in position, such attachments are required to be strong enough to withstand certain external forces that will be exerted when the cellular phone is carried around, and hence take up an unexpectedly large space. Therefore, the magnetic plate and its fixing jigs have been responsible for preventing the cellular phone from having a low profile.

It is an object of the present invention to provide a low-profile cellular phone which has improved radiation efficiency, achieved by a magnetic plate, during a call for higher communication quality, and which is of a structure allowing the cellular phone to be of a lower profile than heretofore with the magnetic plate and awkward structures such as its fixing jigs being not disposed in a gap within an outer case of the cellular phone. It is also an object of the present invention to provide a cellular phone having a magnetic plate which is made more effective than heretofore.

DISCLOSURE OF THE INVENTION

In order to solve the above problems, there is provided in accordance with the present invention a cellular phone a including at least an antenna for mainly sending and receiving radio waves for communication with a base station, a printed-circuit board having a metal surface as a board ground layer for the antenna and electronic components mounted thereon, a feeder for supplying electric power to the antenna and the metal surface, a magnetic plate made of a magnetic material housed in an outer case for intensifying a radio wave in a free space during a talk, and an outer case housing therein the printed-circuit board, the feeder, and the magnetic plate, the cellular phone being arranged such that the printed-circuit board is of a multilayered structure, and the magnetic plate is embedded partly or entirely between inner layers of the printed-circuit board spaced from the board ground layer and opposite to a side of the printed-circuit board spaced where the antenna is located.

The printed-circuit board comprises an N-layered board having N layers, the metal surface (ground layer) being formed as an Lth layer (L satisfies the relationship: 1≦L<N−1) and the magnetic plate being embedded across M layers (M satisfies the relationship: 1≦M≦N−L) between the Lth layer and the Nth layer.

The printed-circuit board may comprise a four-layer board having a first layer as a signal layer closest to the side where the antenna is located, a second layer as a ground layer, a third layer as a power supply layer, and a fourth layer as a signal layer, the magnetic plate being disposed between the third and fourth layers and selectively partly disposed in covering relation to a portion of the antenna and a region near the feeder.

The printed-circuit board may support the antenna and the feeder thereon, the magnetic plate being disposed remotely from the antenna and the feeder across the ground layer in fully covering relation to the antenna, the feeder, and the ground layer. The metal surface of the printed-circuit board may be disposed in a region lower than the feeder, the antenna comprising a helical antenna.

An auxiliary metal plate may be disposed on a side of the magnetic plate opposite to a face thereof which confronts the antenna. Alternatively, a metal surface pattern (auxiliary metal plate) may be formed as the auxiliary metal plate on a layer of the printed-circuit board behind the magnetic plate on the side opposite to the antenna, in a region corresponding to the area of the magnetic plate at a substantially corresponding position.

Alternatively, according to the present invention, there is also provided a cellular phone including at least an antenna for mainly sending and receiving radio waves for communication with a base station, a printed-circuit board having a metal surface as a board ground layer for the antenna and electronic components mounted thereon, a feeder for supplying electric power to the antenna and the metal surface, a magnetic plate made of a magnetic material housed in an outer case for intensifying a radio wave in a free space during a talk, and an outer case housing therein the printed-circuit board, the feeder, and the magnetic plate, the cellular phone being arranged such that the magnetic plate is of a double-layer structure having an auxiliary metal plate lined on a side of the magnetic plate opposite to a face thereof which confronts the antenna, so that the magnetic plate and the metal plate produce combined effects.

The outer case may be made of a nonmetallic material such as plastic or resin, and have an inner surface partly covered with electrically conductive metal, the magnetic plate being directly bonded to a surface of the electrically conductive metal.

In each of the above arrangements, the magnetic plate may have a complex permeability for reflecting a radio wave from the antenna and the metal surface to intensity the radio wave in the space for increased radiation efficiency. The magnetic plate may have a complex permeability ($\mu r'-i\mu r''$, i is the complex unit) where the real part and the imaginary part are related to each other by $\mu r'>\mu r''$ at the frequency used by the cellular phone.

With the cellular phone according to the present invention, since the magnetic plate is embedded between layers of the multilayered printed-circuit board, the magnetic plate is effective to intensify the radio wave radiated into the space during a call for thereby improving radiation efficiency as known in the art (for example, see Japanese laid-open patent publication No. 129266/1999). In addition, because a gap where the magnetic plate has heretofore been placed is not required, the outer case is made thinner by that gap, making it possible to make the cellular phone lower in profile.

With the cellular phone according to the present invention where the auxiliary metal plate (metal surface) is disposed on the back of the magnetic plate, the auxiliary metal plate is expected to further increase the communication quality. Specifically, because the magnetic plate is lined with the metal plate, the metal plate as well as the magnetic plate reflects the radio wave, making it more effective to reflect the radio wave than if the magnetic plate is used alone, for thereby further improving the reflection efficiency.

BEST MODE FOR CARRYING OUT THE INVENTION

Cellular phones according to the present invention will be described in detail below with reference to the drawings. First, a first embodiment of the present invention will be described below.

Structural Example 1

Figure 1:
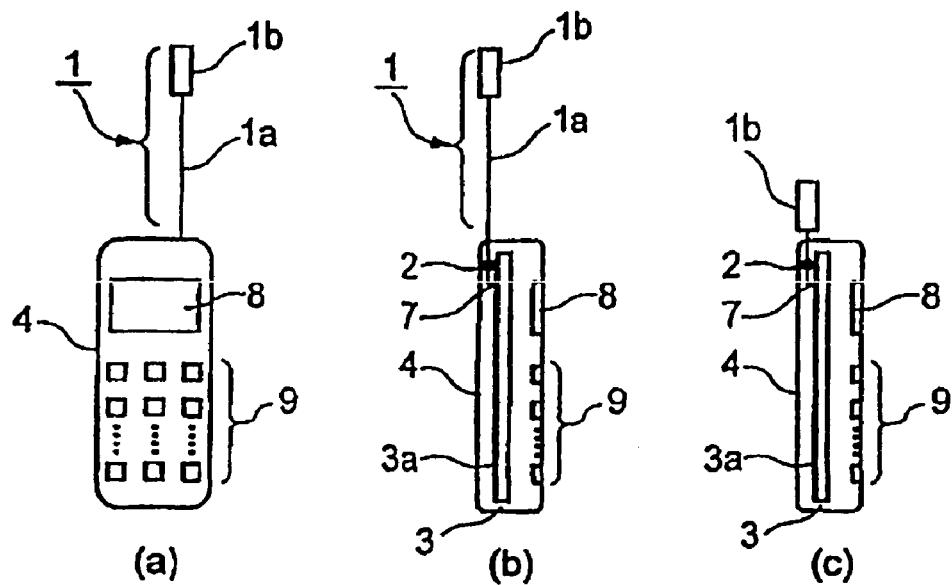
FIGS. 1(a) through 1(c) are views showing a basic arrangement of a first typical conventional cellular phone, FIG. 1(a) being a front elevational view of the cellular phone, FIG. 1(b) a cross-sectional view of the cellular phone with an antenna assembly extended, and FIG. 1(c) a cross-sectional view of the cellular phone with the antenna assembly retracted in a case.
Figure 2:
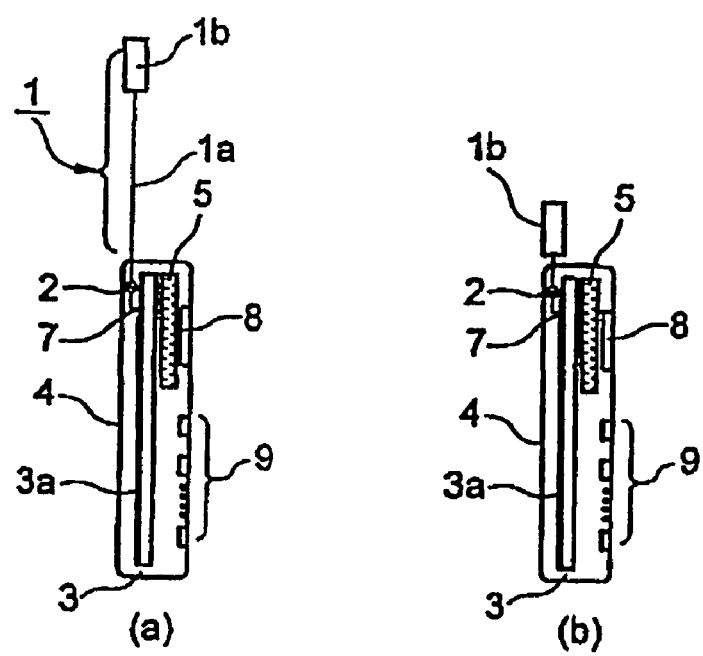
FIGS. 2(a) and 2(b) are views showing a basic arrangement of a second typical conventional cellular phone, FIG. 2(a) being a cross-sectional view of the cellular phone with an antenna assembly extended, and FIG. 2(b) a cross-sectional view of the cellular phone with the antenna assembly retracted in a case.
Figure 3:
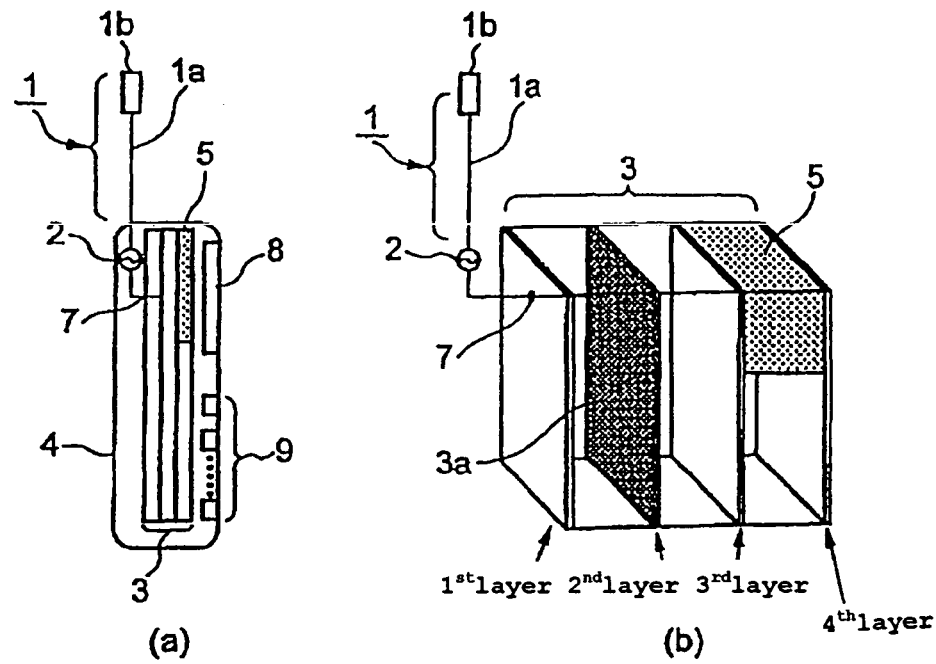
FIGS. 3(a) and 3(b) are views showing a first embodiment (structural example 1) of a low-profile cellular phone according to the present invention, FIG. 3(a) being a cross-sectional view of the cellular phone, and FIG. 3(b) a perspective view of a printed-circuit board, etc. of the cellular phone with an outer case removed.

FIGS. 3(a) and 3(b) show a cellular phone constructed of a four-layer printed-circuit board, which is a structural example of a first embodiment of a cellular phone according to the present invention. FIG. 3(a) is a cross-sectional view of the cellular phone, and FIG. 3(b) is a perspective view of a printed-circuit board, etc. of the cellular phone with an outer case removed. The board used in the present embodiment can be of the same dimensions as those of the boards used in conventional cellular phones.

As shown in FIGS. 3(a) and 3(b), the cellular phone comprises antenna assembly 1 including whip antenna 1a and helical antenna 1b, whip antenna 1a having a length of about $\lambda/4$, feeder 2, printed-circuit board 3, and outer case 4 made of an insulating material such as plastics, molded resin, or the like and housing therein printed-circuit board 3 and feeder 2.

As can be seen from FIGS. 3(a) and 3(b), the printed-circuit board of the cellular phone according to the present invention has magnetic material 5 embedded in a portion thereof which is effective to improve radiation efficiency for increasing communication quality. The cellular phone also has through hole 7, liquid-crystal screen (display unit) 8, and keypad 9.

Printed-circuit board 3 is of a four-layer structure having conductive layers (thin metal layers) which include a first layer closest to the side where antenna assembly 1 is located and successive layers up to a fourth layer, these layers being laminated with dielectric layers sandwiched therebetween. The first layer serves as a signal layer, the second layer as ground layer 3a, the third layer as a power supply layer, and the fourth layer as a signal layer. Magnetic material 5 has the same width as the printed-circuit board, and is embedded between the third and fourth layers, so that it is equivalent to a magnetic plate placed in position. Magnetic plate 5 is disposed in covering relation to a portion of the antenna assembly, the feeder, and a portion of the metal surfaces. The layer in which magnetic material (magnetic plate) 5 is embedded is limited to an inner layer which is positioned remotely from the antenna assembly and the feeder across ground layer 3a.

The spaces between the layers, except the magnetic plate (the space between the first and second layers, the space between the second and third layers, and the portion of the space between the third and fourth layers except the magnetic plate) are filled up with a dielectric material that is widely used in conventional printed-circuit boards, such as glass epoxy, whose dielectric constant is close to that of air.

Ground layer 3a comprises a metal surface. The layers other than the ground layer has patterns such as signal lines and through holes which are produced by etching metal surfaces. Those patterns and through holes are omitted from illustration. Circuit components are mounted on outer surfaces of the first and fourth layers, and the antenna assembly and the feeder are disposed closely to the first layer. The feeder has an end connected to the whip antenna and the other end connected to ground layer 3a via through hole 7. Since the metal surface provided by the second ground layer operates as an auxiliary antenna, its width and length are determined in advance for desired communication performance when the cellular phone is designed.

Figure 4:
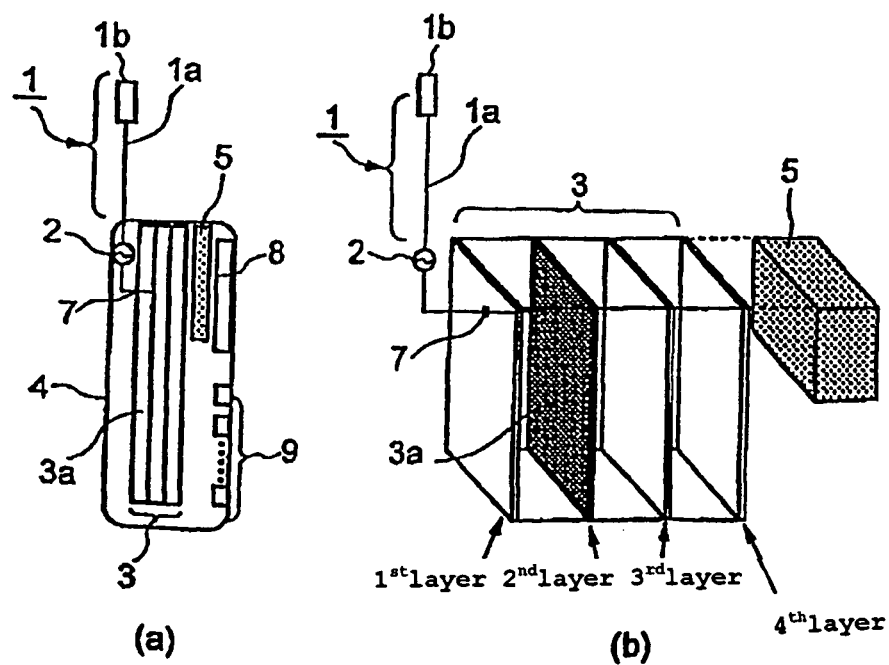
FIGS. 4(a) and 4(b) are views showing a basic structure of a conventional cellular phone, FIG. 4(a) being a cross-sectional view of the cellular phone, and FIG. 4(b) a perspective view of a printed-circuit board, etc. of the cellular phone with an outer case removed.

FIGS. 4(a) and 4(b) show, for comparison purpose, a conventional cellular phone having a four-layer printed-circuit board and a magnetic plate which are of the same dimensions as those in the present structural example, as disclosed in Japanese laid-open patent publication No. 2000-323921. FIG. 4(a) is a cross-sectional view of the cellular phone, and FIG. 4(b) is a perspective view of a printed-circuit board, etc. of the cellular phone with an outer case removed. Reference characters shown in FIGS. 4(a) and 4(b) are identical to those shown in FIGS. 3(a) and 3(b). The magnetic plate is disposed in the gap between the outer case and the board, and the spaces between the layers of the board are filled up with a dielectric material such as glass epoxy or the like. As can be seen from FIGS. 4(a) and 4(b), the conventional arrangement needs to have an installation space for the magnetic plate, so that the outer case is thicker than the outer case according to the present invention.

With the arrangement of the present invention shown in FIGS. 3(a) and 3(b), if the whip antenna has a length of about $\lambda/4$, then the radio wave is predominantly composed of a magnetic component as described in detail in Japanese laid-open patent publication No. 2000-323921. As shown in FIGS. 3(a) and 3(b), since magnetic plate 5 is disposed in covering relation to a region around feeder 2, magnetic plate 5 effectively acts on the magnetic component, providing the same advantages as heretofore. Specifically, the radio wave which is predominantly composed of a magnetic component and radiated from the feeder is reflected by the surface of magnetic plate 5 and radiated into a space where no human body is positioned during the call, with the result that the radio wave which contributes to the communication is intensified and the radiation efficiency is improved during the call, thereby achieving good call characteristics.

The cellular phone thus constructed offers the same advantages as described above even if the antenna assembly is retracted in the outer case with the helical antenna used as a transmission antenna. For example, if helical antenna 1b has an electrical length of about $\lambda/4$, then since the radio wave is predominantly composed of a magnetic component near feeder 2 when the antenna assembly is retracted in the outer case, magnetic plate 5 effectively acts on the radio wave, improving the radiation efficiency and achieving good call characteristics.

According to the present structural example, because magnetic plate 5 is incorporated in the printed-circuit board, as can be seen from a comparison with the arrangement of the conventional cellular phone (see FIGS. 4(a) and 4(b)), it is not necessary to provide awkward structures such as attachments, etc. for fixing the magnetic plate and the magnetic plate itself which have taken up an unexpectedly large space in the conventional arrangement. Therefore, a space which is represented by at least the thickness of the magnetic plate can be eliminated in the outer case. As a space for installing the magnetic plate and its fixing jig therein does not need to be provided, the thickness of outer case 4 can be reduced by such a space, making it possible to make the cellular phone smaller in size and lower in profile as a whole.

Structural Example 2

The cellular phone according to the present invention allows the thickness and location of the magnetic plate incorporated in the printed-circuit board to be changed. In the structural example 1 described above, the magnetic plate is disposed only in the single space between the third and fourth layers of the four-layer printed-circuit board. However, the magnetic plate may be embedded in a 16-layer printed-circuit board, for example, across a plurality of layers, e.g., four layers ranging from 9th to 13th layers.

Figure 5:
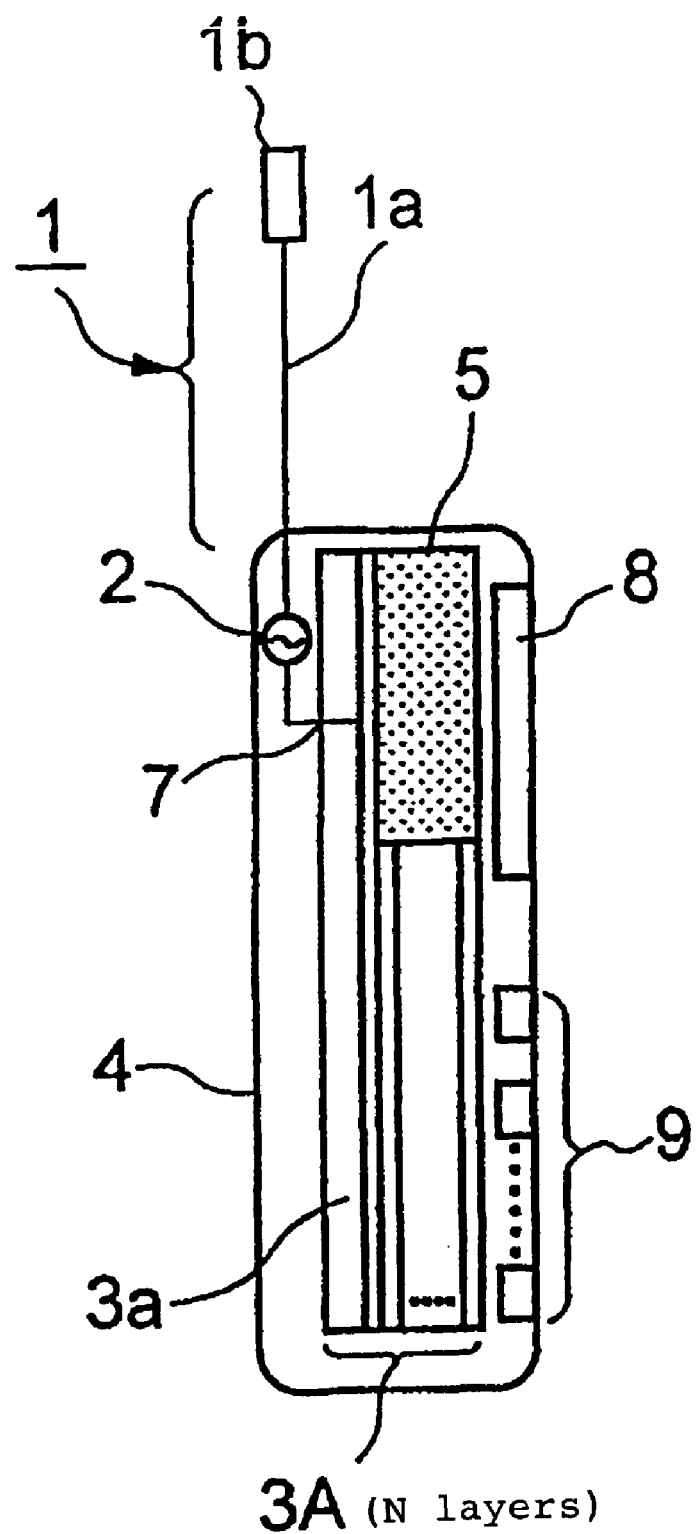
FIG. 5 is a cross-sectional view of a low-profile cellular phone (structural example 2) according to the present invention.

FIG. 5 is a cross-sectional view of a cellular phone having an N-layered printed-circuit board, showing a layered structure of printed-circuit board 3A and the location of magnetic plate 5. Those parts shown in FIG. 5 which are identical to those of the previous structural example are denoted by identical reference characters, and will not be described in detail below. With the N-layered printed-circuit board, if a metal surface (ground layer) is formed as an Lth layer (L satisfies the relationship: $1 \leq L < N-1$), then as shown in FIG. 5, the magnetic plate is embedded in the N-layered printed-circuit board across M layers (M satisfies the relationship: $1 \leq M \leq N-L$) between the Lth layer and the Nth layer.

For example, if a 16-layer printed-circuit board (N=16) is used, then a ground surface is formed as an Lth layer ($1 \leq L < 15$), and the magnetic plate is embedded across M layers ($1 \leq M \leq 16-L$). Patterns such as signal lines are not formed in a spatial region (volume) which is occupied by the magnetic plate.

With this arrangement, as with the previous arrangement, magnetic plate 5 is made fully effective to improve the radiation efficiency and achieve good call characteristics. The cellular phone can also be constructed in a low profile as no installation space is required for the magnetic plate and its fixing jig.

Structural Example 3

Figure 6:
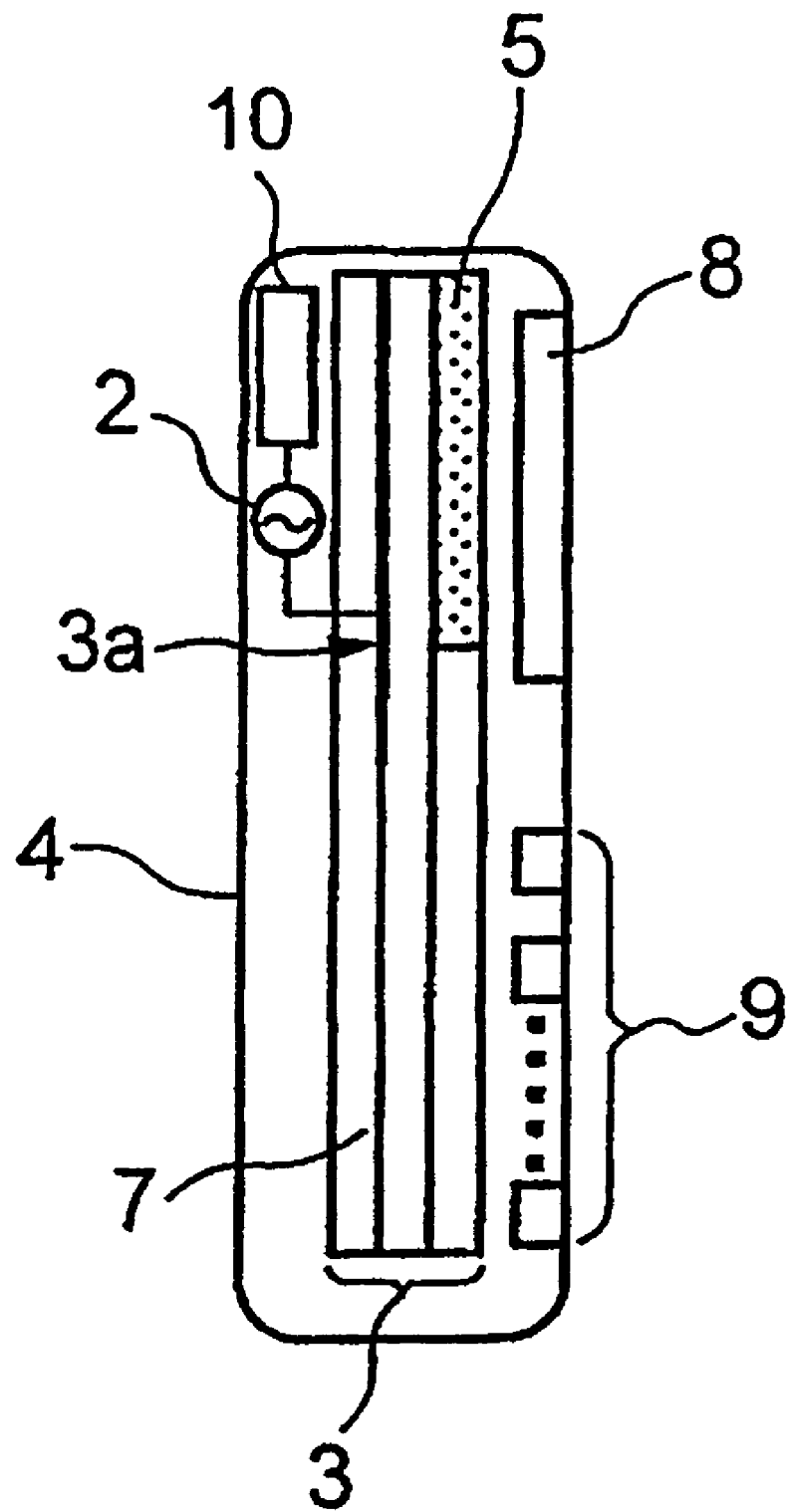
FIG. 6 is a cross-sectional view of a second embodiment (structural example 3) of a low-profile cellular phone according to the present invention.

A structural example of a second embodiment of a cellular phone according to the present invention will be described below. FIG. 6 is a cross-sectional view of a low-profile cellular phone with a built-in antenna according to a structural example 3 which is an example of the second embodiment of the present invention. This structural example employs a four-layer printed-circuit board as with the structural example 1. Generally, the built-in antenna may comprise a small antenna that does not take up a substantial area, such as a plane antenna or a helical antenna, as a fixed antenna. Various such antennas will hereinafter be referred to as an antenna unit. As shown in FIG. 6, the cellular phone comprises antenna unit 10, feeder 2, printed-circuit board 3, and outer case 4.

As seen from FIG. 6, in the cellular phone with the built-in antenna, antenna unit 10 and feeder 2 are mounted on printed-circuit board 3, and all basic components are housed in outer case 4. Antenna unit 10 is disposed in a relatively upper region of printed-circuit board 3 so as to overlap printed-circuit board 3.

Printed-circuit board 3 is substantially identical to the printed-circuit board in the structural example 1, and comprises a four-layer board having a first layer as a signal layer closest to the side where antenna unit 10 is located, a second layer as a ground layer, a third layer as a power supply layer, and a fourth layer as a signal layer. With this printed-circuit board, ground layer 3a is disposed in a region lower than the feeder, and the magnetic plate is embedded between the third and fourth layers so as to cover the antenna unit and the feeder. As with the structural example 1, the spaces between the layers, except the magnetic plate, are filled up with a dielectric material that is widely used in conventional printed-circuit boards, such as glass epoxy, whose dielectric constant is close to that of air.

With the structural example 1, when the antenna assembly is retracted, the helical antenna remains seated on the upper surface of the outer case, and the magnetic plate incorporated in the printed-circuit board is almost ineffective on the radio wave radiated from the helical antenna in its entirety.

With the cellular phone according to the second embodiment of the present invention as shown in FIG. 6, a small-size helical antenna, for example, used in the antenna unit is incorporated as a fixed antenna, and magnetic plate 5 is arranged to cover the antenna in its entirety. Therefore, the magnetic plate operates effectively with respect to the radio wave radiated from the fixed antenna in its entirety, and hence is more effective in increasing the call characteristics.

As with the structural example 1, as can be apparent from a comparison with the conventional cellular phone structure (see FIGS. 4(a) and 4(b), since awkward structures such as fixing jigs for the magnetic plate and the magnetic plate, which have heretofore taken up an unexpectedly large space in the conventional structure, are not required, there is provided an effective space which is represented by at least the thickness of the magnetic plate. Consequently, the thickness of the outer case can be reduced by such a space, making it possible to make the cellular phone smaller in size and lower in profile as a whole.

As described above, the basic structure according to the present invention is applicable to a cellular phone with a built-in antenna which is housed in an outer case, and bring out effectiveness. Such a cellular phone is also advantageous in that since it does not have a protrusion such as an antenna, it does not caught by something else when it is taken into and out of a bag or a pocket.

Figure 7:
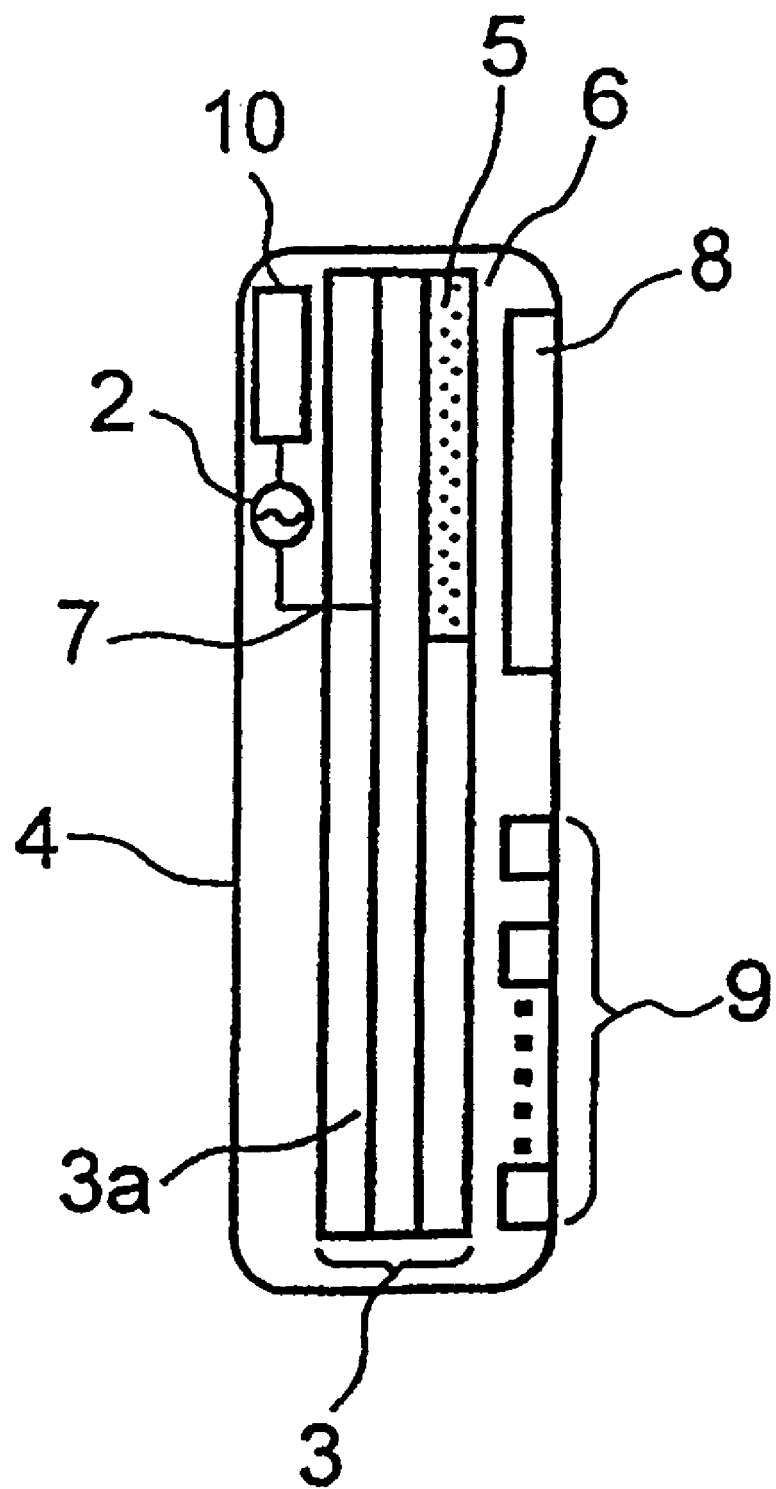
FIG. 7 is a cross-sectional view of a low-profile cellular phone (structural example 4) according to the present invention.

If the antenna unit comprises a plane antenna, then, as with a cellular phone (structural example 4) shown in the cross-sectional view of FIG. 7, the ground layer serving as the second layer may have its entire surface constructed as a metal surface. In this arrangement, the magnetic plate may also be disposed in covering relation to the region around the antenna unit and the feeder.

Structural Example 5

A third embodiment of a cellular phone according to the present invention will be described below with respect to a specific structural example. A structural example of a cellular phone which has been improved for better communication performance over the low-profile cellular phones of the foregoing structures.

Figure 8:
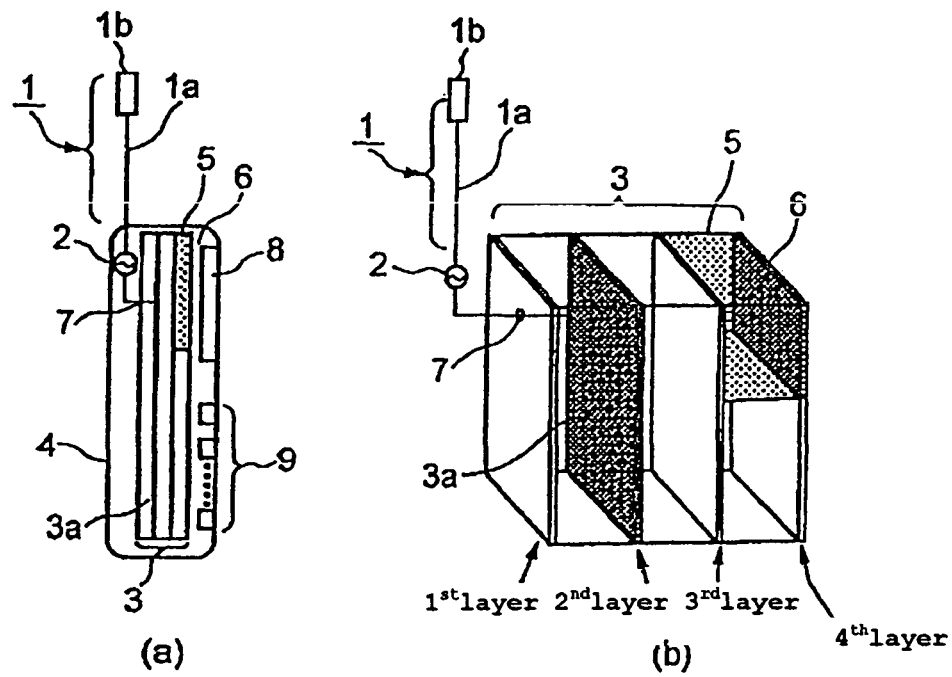
FIGS. 8(a) and 8(b) are views showing a third embodiment (structural example 5) of a low-profile cellular phone according to the present invention, FIG. 8(a) being a cross-sectional view of the cellular phone, and FIG. 8(b) a perspective view of a printed-circuit board, etc. of the cellular phone with an outer case removed.

FIGS. 8(a) and 8(b) show a cellular phone according to a structural example 5 comprising a four-layer printed-circuit board. FIG. 8(a) is a cross-sectional view of the cellular phone and FIG. 8(b) is a perspective view of a portion of a printed-circuit board of the cellular phone with an outer case removed for illustrating a layered structure of printed-circuit board 3. Those parts shown in FIGS. 8(a) and 8(b) which are common (represented by identical reference characters) to the previous structural examples will not be described in detail below. The present cellular phone is basically identical in structure to the structural example 1, but has a printed-circuit board partly improved for better communication performance.

Specifically, as shown in FIG. 8(b), metal surface pattern 6 which is of the same size as the area region of magnetic plate 5 is formed on the fourth layer of the printed-circuit board. This structure is equivalent to an arrangement where the back of the magnetic plate (facing the keypad) is lined with auxiliary metal plate 6. This arrangement makes auxiliary metal plate 6 as well as magnetic plate 5 effective in providing an increased ability to reflect the radio wave radiated from the antenna.

The magnetic plate structure lined with the metal surface pattern improves the radiation efficiency during a call for better call characteristics.

The arrangement where magnetic plate 5 is lined with metal surface pattern (metal plate) 6 is also applicable to a structure in which magnetic plate 5 is embedded over multiple layers, as with structural example 2 described above.

Structural Example 6

The arrangement of the present invention which employs the magnetic plate lined with the metal surface pattern, as described above, is capable of achieving better communication performance due to the effect provided by both the magnetic plate and the auxiliary metal plate. This feature alone may be applied to a cellular phone which is allowed to have a relatively large thickness.

Figure 9:
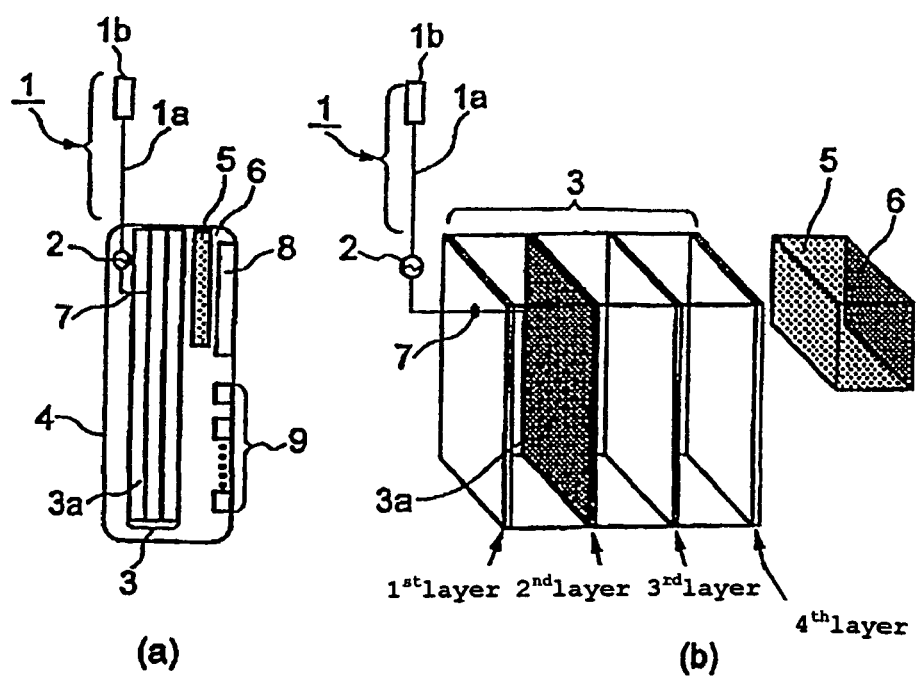
FIGS. 9(a) and 9(b) are views showing a low-profile cellular phone (structural example 6) according to the present invention, FIG. 9(a) being a cross-sectional view of the cellular phone, and FIG. 9(b) a perspective view of a printed-circuit board, etc. of the cellular phone with an outer case removed.

FIGS. 9(a) and 9(b) show a cellular phone according to a structural example 6 in which a magnetic plate lined with an auxiliary metal plate is disposed in the vicinity of a feeder near a printed-circuit board in an outer case. FIG. 9(a) is a cross-sectional view of the cellular phone and FIG. 9(b) is a perspective view of a portion of a printed-circuit board of the cellular phone with an outer case removed for illustrating a layered structure of printed-circuit board 3. Those parts shown in FIGS. 9(a) and 9(b) which are common to the previous structural examples are denoted by identical reference characters and will not be described in detail below.

Magnetic plate 5 is of a double-layer structure with auxiliary metal plate 6 added. In the present structural example, since a sufficient gap space is provided, the layout of magnetic plate 5 and auxiliary metal plate 6 inserted within the outer case may be identical to the conventional layout, and auxiliary metal late 6 provides higher communication performance.

Structural Example 7

Figure 10:
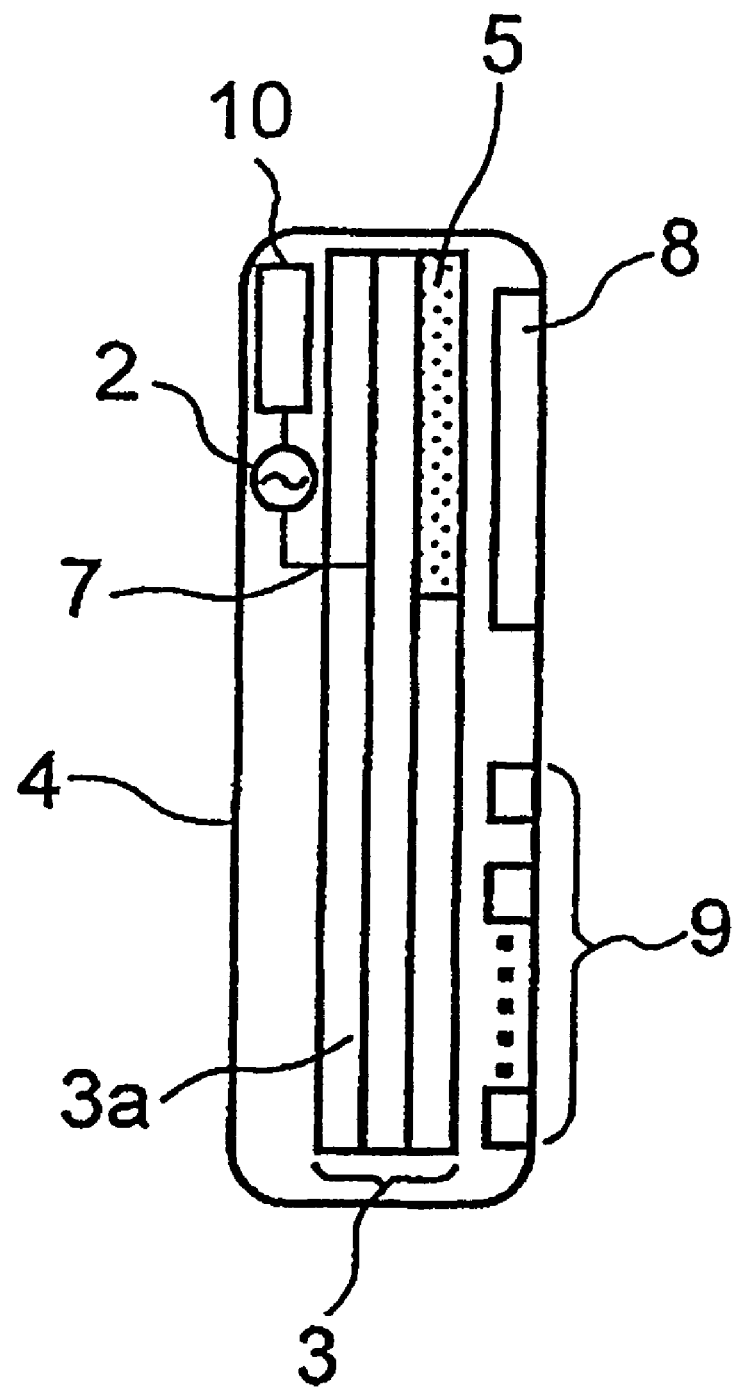
FIG. 10 is a cross-sectional view of a low-profile cellular phone (structural example 7) according to the present invention.

Similarly, the previous structural example 3 where the antenna is housed in the outer case or the cellular phone with the built-in antenna according to structural example 4 may have its magnetic plate lined with a metal surface pattern for making the magnetic plate more effective. Such a structure example of a cellular phone with a built-in antenna, which corresponds to structural example 3, is shown in FIG. 10. Metal surface pattern 6 is formed on the fourth layer of magnetic plate 5 on the side behind antenna unit 10, in a region corresponding to the area of magnetic plate 5, i.e., magnetic plate 5 is lined with an auxiliary metal plate.

The structural examples 1 through 7 have been described above as specific examples of the cellular phone according to the present invention. However, the cellular phone according to the present invention may be improved in various ways as described below with respect to shapes and structures.

Figure 11:
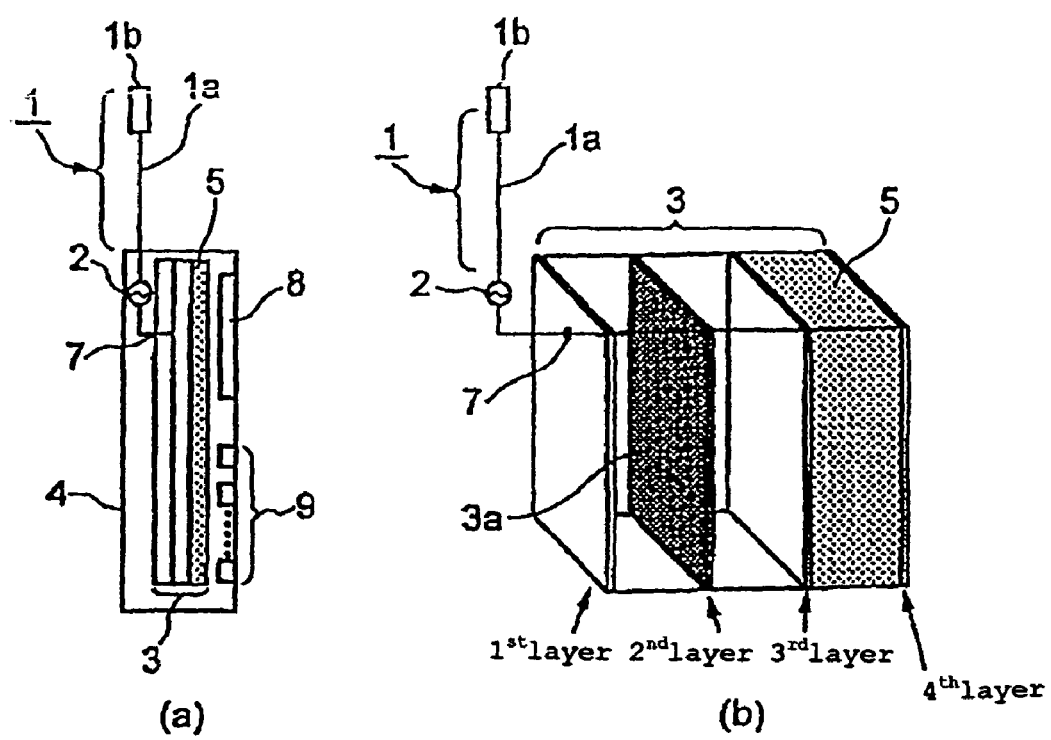
FIGS. 11(a) and 11(b) are views showing a low-profile cellular phone (structural example 8) according to the present invention, FIG. 11(a) being a cross-sectional view of the cellular phone, and FIG. 11(b) a perspective view of a printed-circuit board, etc. of the cellular phone with an outer case removed.

In the illustrated structural examples, the magnetic plate is incorporated only partly between the layers. However, the magnetic plate may be embedded entirely between the layers. For example, while the magnetic plate is disposed selectively between the third and fourth layers in the vicinity of the feeder in the structural example 1 (see FIGS. 3(a) and 3(b)), the magnetic plate may be embedded entirely between the layers. An example [structural example 8] of a cellular phone thus constructed is shown in the cross-sectional and perspective views of FIGS. 11(a) and 11(b).

The outer cases of cellular phones are generally made of an insulating material such as resin. However, some outer cases are plated with an electrically conductive layer on their inner surface or some outer cases are partly made of electrically conductive metal. Such an electrically conductive outer case may be used as a structural element of a cellular phone according to the present invention.

The structural examples 5, 6, and 7 employ the metal-lined magnetic plate. However, a lining metal surface pattern may be electrically connected to an electrically conductive outer case for use as a strengthened ground layer which also serves as a more effective reflecting plate.

Figure 12:
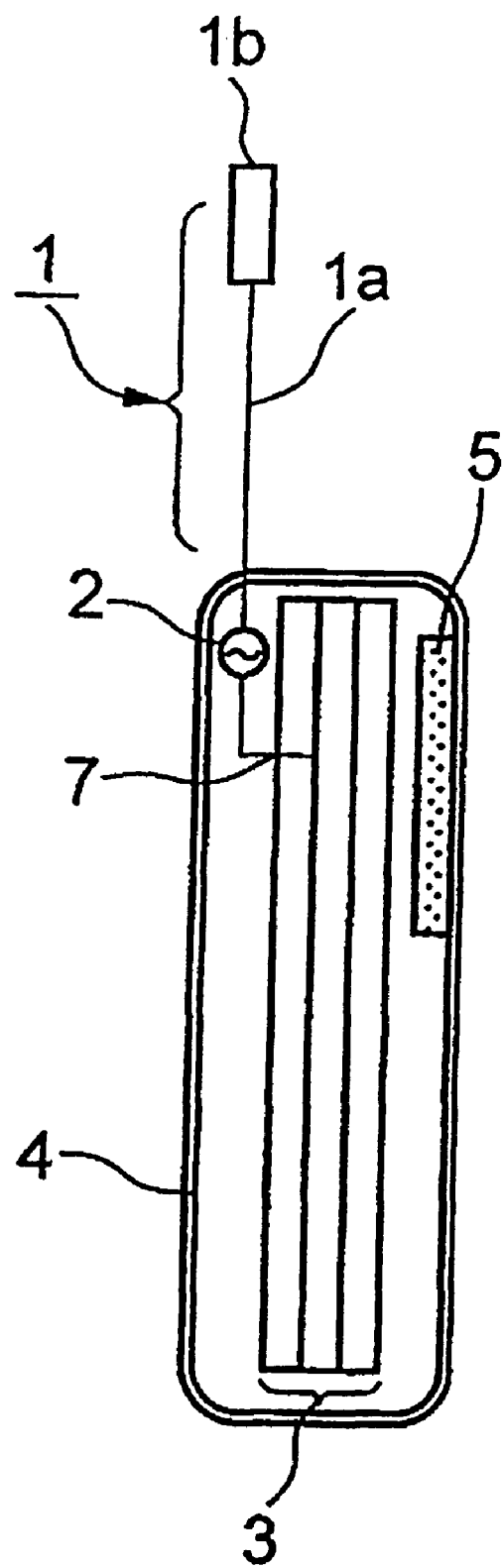
FIG. 12 is a cross-sectional view of a low-profile cellular phone (structural example 9) according to the present invention.

Instead of a lining metal surface pattern, an outer case which is plated with an electrically conductive layer on its inner surface or an electrically conductive outer case partly made of electrically conductive metal may be used with the magnetic plate directly bonded to the electrically conductive region of the outer case. An example [structural example 9] of a cellular phone thus constructed is shown in the cross-sectional view of FIG. 12.

The magnetic plate for use in the applications of the present invention should preferably be minimally capable of absorbing electric power by itself, and it is preferable that the loss term of the complex permeability of the magnetic plate be minimum. However, even if the magnetic plate causes a loss, it may be effective as a whole. Therefore, the magnetic plate according to the present invention may have a complex permeability due to its own effect for intensifying the radio wave in the space for improved radiation efficiency. For example, the present invention may employ a magnetic plate having a complex permeability ($\mu r'-i\mu r''$, i is the complex unit) where the real part and the imaginary part are related to each other by $\mu r'>i\mu r''$ at the frequency used by the cellular phone. The magnetic plate may be made of a sintered ferrite material or its composite material or a metallic magnetic material such as a metallic multilayered thin film.

INDUSTRIAL APPLICABILITY

As described above, a cellular phone according to the present invention has a magnetic plate embedded between layers of a multilayered printed-circuit board. The magnetic plate is effective to improve radiation efficiency during a call. Since an outer case can be made thinner by a gap where the magnetic plate has heretofore been positioned, a low-profile cellular phone is provided.

Furthermore, a cellular phone according to the present invention has a metal surface disposed on a back surface of a magnetic plate. Consequently, the cellular phone is more effective to increase radiation efficiency than if the magnetic plate were used alone, and is expected to have better communication quality.

The invention claimed is:

1. A cellular phone comprising:
an antenna for mainly sending and receiving radio waves for communication with a base station, a printed-circuit board having a metal surface as a board ground layer for the antenna and electronic components mounted thereon, a feeder for supplying electric power to said antenna and said metal surface, a magnetic plate made of a magnetic material for intensifying a radio wave in a free space during a talk, and an outer case housing therein said printed-circuit board, said feeder, and said magnetic plate, wherein said printed-circuit board is a multilayered structure; and said magnetic plate is embedded partly or entirely between layers of said printed-circuit board spaced from said board ground layer and opposite to a side of the printed-circuit board where said antenna is located.

2. A cellular phone according to claim 1, wherein said printed-circuit board comprises an N-layered board having N layers, said metal surface (ground layer) being formed as an Lth layer (L satisfies the relationship: $1 \leq L < N-1$) and said magnetic plate being embedded across M layers (M satisfies the relationship: $1 \leq M < N-L$) between the Lth layer and the Nth layer.

3. A cellular phone according to claim 2, wherein said printed-circuit board comprises a four-layer board having a first layer as a signal layer closest to the side where said antenna is located, a second layer as a ground layer, a third layer as a power supply layer, and a fourth layer as a signal layer, said magnetic plate being disposed between the third and fourth layers and selectively partly disposed in covering said antenna and a region near the feeder.

4. A cellular phone according to any one of claims 1 through 3, wherein said printed-circuit board supports said antenna and said feeder thereon, said magnetic plate being disposed remotely from said antenna and said feeder across said ground layer in fully covering said antenna, said feeder, and said ground layer.

5. A cellular phone according to claim 4, wherein said metal surface of said printed-circuit board is disposed in a region lower than said feeder, said antenna comprising a helical antenna.

6. A cellular phone according claim 1, wherein an auxiliary metal plate is disposed on a side of said magnetic plate opposite to a face thereof which confronts said antenna.

7. A cellular phone according to claim 6, wherein a metal surface pattern is formed as said auxiliary metal plate on a layer of said printed-circuit board behind said magnetic plate on the side opposite to said antenna, in a region corresponding to the area of said magnetic plate.

8. A cellular phone according claim 1, wherein said magnetic plate has a complex permeability for reflecting a radio wave from said antenna and said metal surface to intensity the radio wave in the space for increased radiation efficiency.

9. A cellular phone according to claim 8, wherein said magnetic plate has a complex permeability ($\mu r' - i\mu r''$, i is the complex unit) where the real part and the imaginary part are related to each other by $\mu r' > \mu r''$ at the frequency used by the cellular phone.

10. A cellular phone comprising:

an antenna for mainly sending and receiving radio waves for communication with a base station, a printed-circuit board having a metal surface as a board ground layer for the antenna and electronic components mounted thereon, a feeder for supplying electric power to said antenna and said metal surface, a magnetic plate made of a magnetic material for intensifying a radio wave in a free space during a talk, and an outer case housing therein said printed-circuit board, said feeder, and said magnetic plate, wherein said magnetic plate is of a double-layer structure having an auxiliary metal plate lined on a side of said magnetic plate opposite to a face thereof which confronts said antenna.

11. A cellular phone according to claim 8, wherein said outer case is made of a nonmetallic material such as plastic, and has an inner surface partly covered with electrically conductive metal, said magnetic plate being directly bonded to a surface of said electrically conductive metal.

* * * * *